United States Patent

Monicault

[11] Patent Number: 5,880,454
[45] Date of Patent: Mar. 9, 1999

[54] ELECTRONIC PAYMENT CARD WITH AN INTERCHANGEABLE MODULE

[75] Inventor: André Monicault, Clamart, France

[73] Assignee: Schlumberger Industries, Montrouge Cedex, France

[21] Appl. No.: 638,936

[22] Filed: Apr. 25, 1996

[30] Foreign Application Priority Data

May 11, 1995 [FR] France .................................. 95 05698

[51] Int. Cl.⁶ ............................ G06K 7/10; G06K 19/06
[52] U.S. Cl. ........................... 235/492; 235/486; 235/488
[58] Field of Search ................................. 235/487, 482, 235/486, 380; 283/98, 100, 108, 107, 904; 40/156, 652

[56] References Cited

U.S. PATENT DOCUMENTS

| | | | |
|---|---|---|---|
| 5,245,169 | 9/1993 | Nakano | 235/486 |
| 5,281,799 | 1/1994 | McIntire et al. | 235/380 |
| 5,362,955 | 11/1994 | Haghiri-Tehrani | 235/492 |
| 5,514,862 | 5/1996 | Salzano | 235/487 |
| 5,581,065 | 12/1996 | Nishikawa et al. | 235/492 |

*Primary Examiner*—Donald T. Hajec
*Assistant Examiner*—Thien Minh Le
*Attorney, Agent, or Firm*—Frishauf, Holtz, Goodman, Langer & Chick

[57] ABSTRACT

An electronic payment card includes a support of standardized thickness and an electronic module having a semiconductor component, the module being designed to be incorporated in the support. The electronic module is included in a miniature card of thickness equal to the standardized thickness, the support having an opening for receiving the miniature card. The opening and the miniature card have complementary parts for removably installing the miniature card in the opening and suitable, firstly, for preventing the miniature card from being positioned incorrectly in the opening and, secondly, for integrating the miniature card exactly in the thickness of the support. The card is applicable to the field of electronic transactions requiring the use of a memory card.

8 Claims, 3 Drawing Sheets

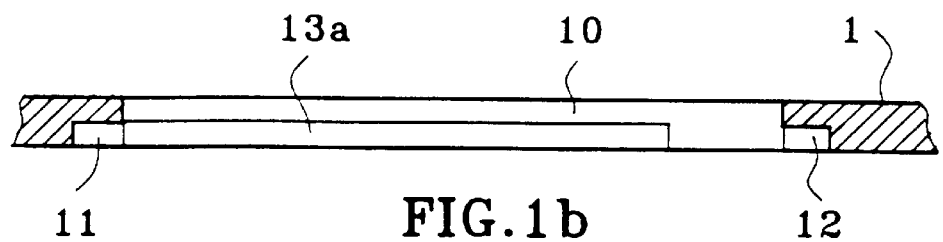
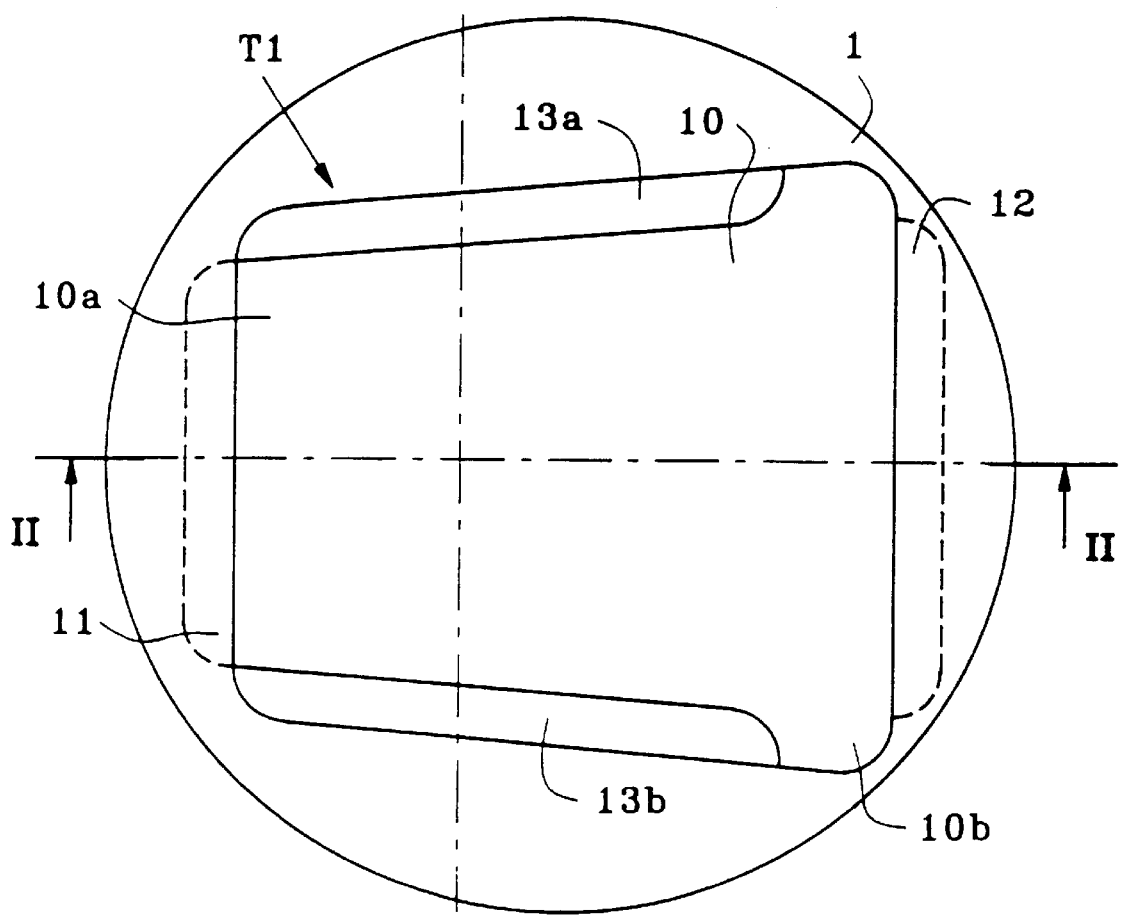

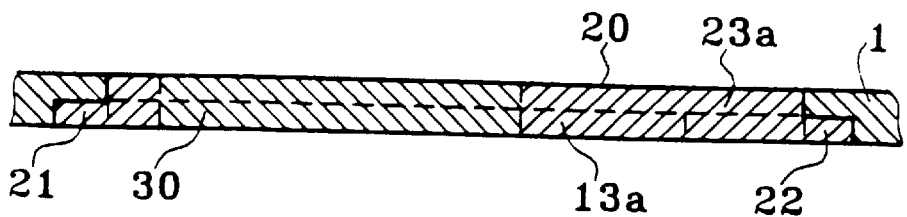
FIG.3
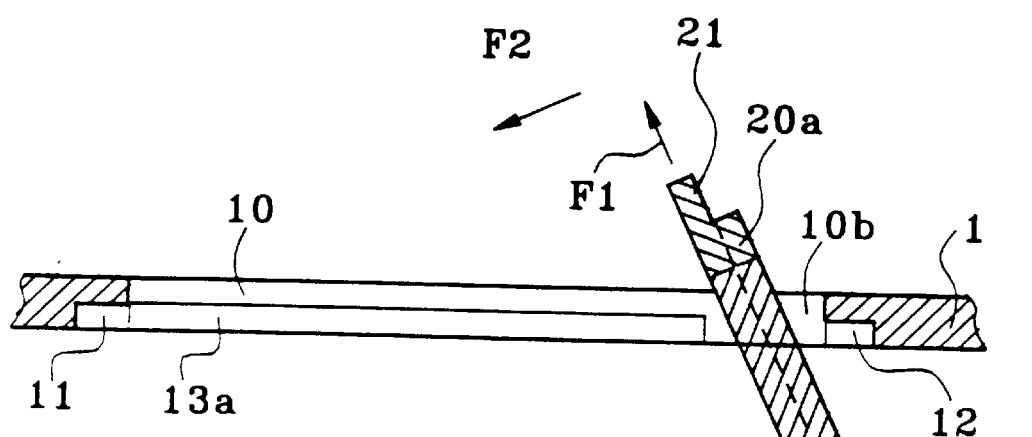
FIG.4
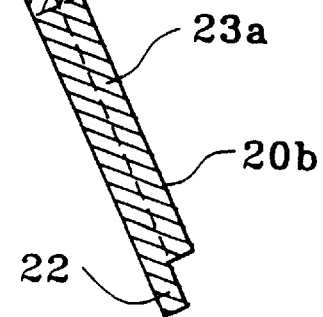

5,880,454

ELECTRONIC PAYMENT CARD WITH AN INTERCHANGEABLE MODULE

The present invention relates to an electronic payment card of the memory card type.

A particularly advantageous application of the invention lies in the field of memory cards for implementing electronic transactions, in particular in association with pay phones for which telephone charges are paid by means of prepaid "phone cards".

BACKGROUND OF THE INVENTION

In general, the memory cards used for performing electronic payments include a semiconductor component, also referred to as a "chip", placed on an intermediate element carrying electric contacts to which the component is connected by metal wires.

The assembly comprising the intermediate element and the semiconductor component constitutes an electronic module of dimensions that are small enough to require it to be integrated in a support of greater dimensions, that is easier to handle, and that is referred to as a "card body".

Nowadays, card bodies are of a format standardized by an ISO standard, being 85.6 mm long, 54 mm wide, and 0.80 mm thick.

The electronic module may be incorporated in the card by being affixed in a machined cavity if the card body is made by rolling, or by being inserted in a mold when the card body is made by molding.

Naturally, under no circumstances can the electronic module be removed from the card body once it has been integrated therein. For example, when the sum available in a phone card has been spent, then the entire card, i.e. the module and the card body, must be discarded.

In the field of mobile telephony, there also exist electronic modules which are carried by miniature cards known as "plugs" that are much smaller in size than the above-mentioned ISO cards and that are designed to be inserted in a mobile telephone.

Some such miniature cards are presented on an ISO format card to which they can be mechanically secured, e.g. by means of slideways disposed on the surface of the card.

The card proper serves only as a support for said miniature cards, which need to be separated therefrom in order to be used, and then after use they are reconnected therewith for storage and transport.

In other cases, mobile telephone miniature cards are sold integrated in releasable manner to a card body in the ISO format. To separate the miniature card, the user must break ties connecting it to the card body, with this being irreversible. The card body is then of no further use and is discarded.

It will be observed in both of the above examples that the presence of an ISO format card body serves only to compensate for the small dimensions of the miniature card by offering the user a support that is easier to handle.

It should also be observed that under no circumstances does the card body play any role when the electronic module is in use.

OBJECTS AND SUMMARY OF THE INVENTION

Thus, an object of the present invention is to provide an electronic payment card comprising a support of standardized thickness and an electronic module having a semiconductor component, such that the module is designed to be incorporated in said support.

Another object of the invention is that the electronic module be genuinely interchangeable in the sense that after the initially provided number of transactions has been exhausted, it can be replaced by another module without changing the support.

A further object of the invention is that the module can be used only in association with said support, as is the case for the phone cards presently in use with pay phones.

These and other objects are attained in accordance with one aspect of the present invention which involves said electronic module being included in a miniature card of thickness equal to said standardized thickness, said support having an opening for receiving said miniature card, and said opening and the miniature card including complementary means for removably installing said miniature card in the opening and suitable, firstly, for preventing the miniature card from being positioned incorrectly in the opening and, secondly, for integrating the miniature card exactly in the thickness of the support.

It is thus possible, initially, to buy a payment card of the invention comprising a new miniature card together with its support or card body, and then after the miniature card has been exhausted, to buy a new miniature card on its own for replacement purposes while retaining the same support.

Also, when the miniature card is engaged in the support, the assembly complies with the ISO standards, in particular concerning thickness, thereby enabling the card of the invention to be used quite normally in the usual way.

It will be understood that the support which is designed to be retained by its holder can be personalized and may carry markings such as the address of the holder, or even a photograph.

By way of example, the miniature cards proper may be of different colors depending on their financial value or the number of units available. Provision may also be made to mark various items of information on the backs of such miniature cards (serial numbers, surveillance numbers, etc.) or indeed to print miniature slogans thereon.

In a particular embodiment of the electronic payment card of the invention, provision is made for said complementary means for removably installing the miniature card to comprise setbacks formed on two sides of the opening and designed to co-operate with two complementary tongues of thickness equal to the depth of said setbacks projecting from the miniature card, and two tongues protecting from part only of the other two sides of the opening and designed to co-operate with two complementary setbacks of corresponding depth formed in the miniature card.

This prevents the miniature card from being installed in the wrong way, i.e. reversed in the front-back direction.

According to the invention, in order to prevent the miniature card from being installed the wrong way in its own plane, the opening of the support and the miniature card are trapezium-shaped, said setbacks in the opening being formed in two parallel opposite sides of said opening, and said tongues of the opening projecting along part only of the other two opposite sides of said opening, the opening being entirely free at the wide base of said trapezium shape.

BRIEF DESCRIPTION OF THE DRAWINGS

FIG. 1a is a plan view of an opening in an electronic payment card of the invention.

FIG. 1b is a side view in section of the opening along line II—II in FIG. 1a.

FIG. 2b is a side view in section of the miniature card along line III—III of FIG. 2a.

FIG. 3 is a side view in section of the miniature card of FIGS. 2a and 2b assembled in the opening of FIGS. 1a and 1b.

FIG. 4 is a side view in section showing how the miniature card of FIGS. 2a and 2b is installed in the opening of FIGS. 1a and 1b.

DETAILED DESCRIPTION OF THE INVENTION

FIGS. 1a and 1b are a plan view and a section view of an opening 10 formed through the support 1 of an electronic payment card. The support 1 is shown in part only in the above figures, and comprises a memory card body whose dimensions and in particular whose thickness are as defined by the above-mentioned ISO standard.

Figure 2B:
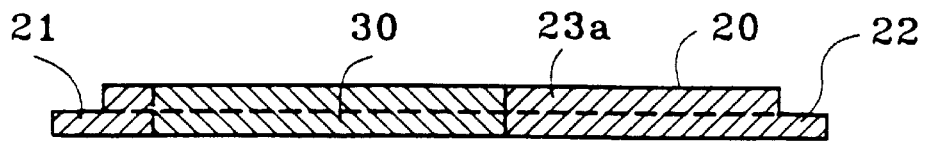
Figure 2A:
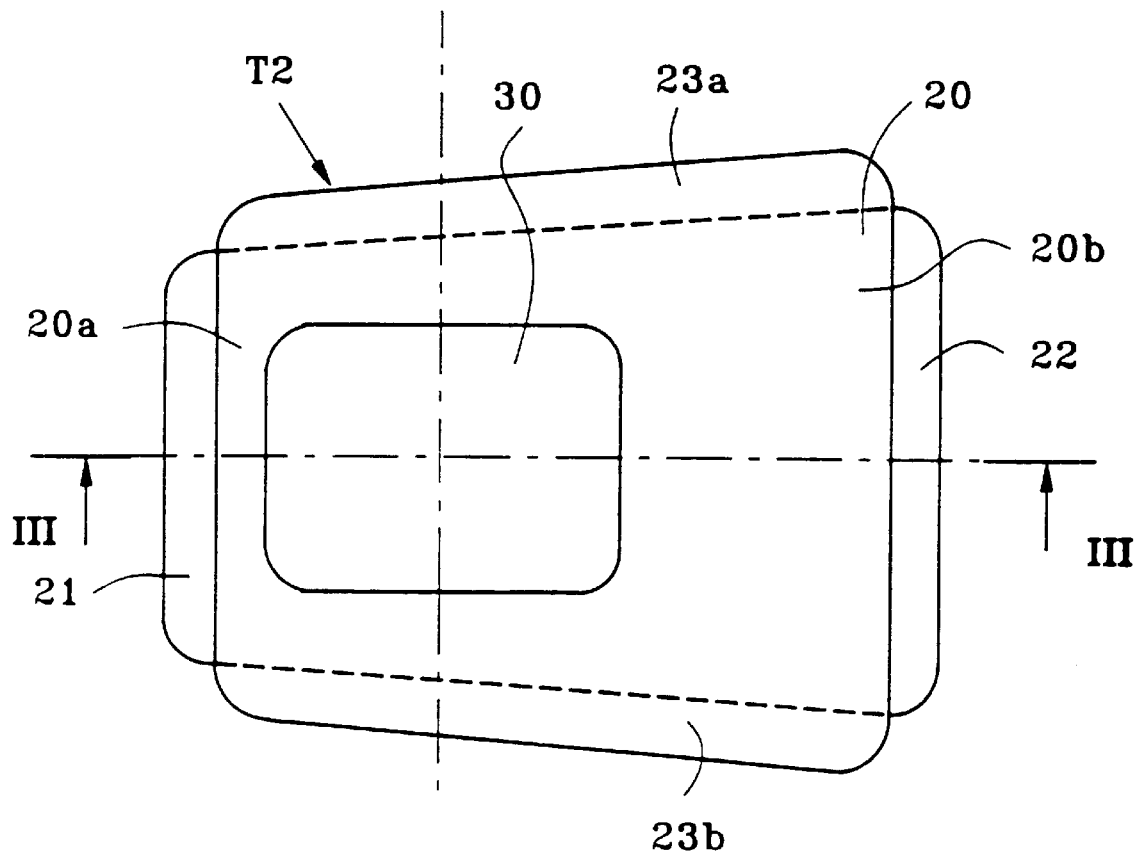
FIG. 2a is a plan view of a miniature card for an electronic payment card of the invention.

The opening 10 in the support 1 is designed to receive a removable miniature card 20 shown in plan view and in section in FIGS. 2a and 2b. The thickness of the miniature card 20 is equal to the standardized thickness for the support 1 and it contains an electronic module 30 constituted, in conventional manner, by a semiconductor component (not shown per se) together with an intermediate element (likewise not shown) carrying electrical connections for establishing electric contact with a card reader.

The electronic module 30 can be integrated in the miniature card 20 by any technical means well known in the field of memory cards. However, in the present case, since the miniature card 20 is preferably molded, it is advantageous to use a method of integration that consists in placing the electronic module 30 directly in the mold in which the miniature card 20 is molded.

It is appropriate to specify at this point that given the presence of the opening 10, it is also preferable for the support 1 to be made by molding. Nevertheless, said opening can also be obtained by machining or cutting out the support.

The materials used both for the support 1 and for the miniature card 20 are those conventionally used in this technology, namely polyethylene and polycarbonates.

As shown in FIGS. 1a to 2b, the opening 10 and the miniature card 20 have complementary means for removably installing said miniature card 20 in said opening 10, said means being suitable, firstly, to prevent the miniature card 20 from being positioned incorrectly in the opening 10 and, secondly, for integrating the miniature card 20 exactly in the thickness of the support 1.

More precisely, in the embodiment of FIGS. 1a to 2b, said complementary means for removable installation comprise a common trapezium shape T1, T2 given both to the opening 10 and to the miniature card 20. This particular asymmetrical shape makes it possible, as described in greater detail below, to facilitate installation of the miniature card 20 in the opening 10 by engaging the narrow end 20a of the miniature card in the wide base 10b of the opening (FIG. 4). The trapezium shape serves also to prevent the miniature card 20 from being positioned incorrectly within its own plane. If it were to be installed in a head-to-tail position relative to its nominal position, then the appropriate electrical contacts would not be ensured with the card reader.

The complementary means for removable installation of the miniature card 20 in the opening 10 also comprise setbacks 11 and 12 formed in the two opposite parallel sides of the opening 10 designed to co-operate with and engage two complementary tongues 21 and 22 of thickness equal to the depth of said setbacks 11 and 12 projecting from the corresponding sides of the miniature card 20.

Similarly, on the other two opposite sides of the opening 10, there are two tongues 13a and 13b extending only part of the way along said sides so that the opening 10 has its full available width at the wide base 10b of the trapezium shape T1.

Since co-operation can be established between the setbacks and the tongues in one way only, it is not possible to install the miniature card upside-down in the opening.

FIG. 3 shows the miniature card 20 fully installed in the opening 10 of the support 1. It can be seen that the miniature card is accurately integrated in the standardized thickness of the support 1, and can therefore be used in entirely normal manner like a memory card having a module that is fixed.

FIG. 4 shows how the miniature card 20 is installed in the opening 10.

The narrow base 20a of the miniature card 20 is inserted through the wide base 10b of the opening, which wide base has its full width available since the tongues 13a and 13b which extend along the other two opposite sides, starting from the narrow base 10a of the opening, do not extend all the way therealong. The direction of insertion movement is represented by arrow F1 in FIG. 4.

Thereafter, the user tilts the miniature card 20 in the direction of arrow F2 so as to engage the tongue 21 of the miniature card in the setback 11 of the opening, with this requiring a small amount of bending force to be applied. Simultaneously, the tongue 22 is engaged quite naturally in the corresponding setback 12.

To remove the miniature card 20 from the opening 10, it suffices to press on the wide portion 20b of the miniature card so as to disengage the tongue 22 from the setback 12, and then to cause it to slide so as to disengage the tongue 21 from the setback 11, after which movement can be applied in directions that are opposite to those indicated by arrows F2 and F1, and in that order.

It is readily apparent to anyone with ordinary skill in the art that the invention is not limited to the opening and the miniature card being of a trapezium shape only. In particular, as for the "plug" type cards used in mobile telephones, the opening in the support and the miniature card may be rectangular in shape with at least one cut-off corner, said setbacks in the opening being formed on two parallel sides of said opening and said tongues of the opening being provided over part of the length of two other parallel sides of said opening, the opening being entirely free along a side remote from said cut-off corner.

I claim:

1. An electronic payment card comprising:

a support having a thickness;

an electronic module having a semiconductor component; and a miniature card to which said electronic module is affixed and having a thickness substantially equal to the thickness of the support, said support having an opening for receiving the miniature card, and a periphery of the opening and the miniature card each including complementary means for removably securing the miniature card in the opening to enable re-insertion of the miniature card securely into the opening, wherein said complementary means ensure that the miniature card is properly positioned in the opening and that the miniature card is integrated into said support such that the thickness of the miniature card does not extend beyond the thickness of the support.

2. A card according to claim 1, wherein said complementary means for removably securing the miniature card comprise:

(i) setbacks formed on two sides of the opening operatively associated with two respective complementary tongues of thickness equal to the depth of said setbacks projecting from the miniature card, and (ii) two tongues respectively projecting from a portion of the other two sides of the opening operatively associated with two respective complementary setbacks of corresponding depth formed in the miniature card.

3. The card according to claim 2, wherein the opening of the support and the miniature card are trapezium-shaped having a wide base, wherein said setbacks of the opening are formed in two substantially opposite sides of said opening, and wherein said two respective complementary tongues of the opening project along a portion of the other two opposite sides of said opening, the opening being substantially accessible at the wide base of said trapezium shape.

4. The card according to claim 2, wherein the opening of the support and the miniature card are substantially rectangular in shape with at least one corner thereof being cut-off, said setbacks of the opening being formed in two substantially opposite sides of said opening, and said first and second complementary tongues of the opening project along a portion of the other two parallel sides of said opening, the opening being substantially accessible along a side that is distal with respect to the cut-off portion.

5. The card according to claim 1, wherein the miniature card is molded.

6. The card according to claim 1, wherein the support is molded.

7. The card according to claim 1, wherein the opening is obtained by machining the support.

8. The card according to claim 1, wherein the opening is obtained by cutting out the support.

* * * * *

UNITED STATES PATENT AND TRADEMARK OFFICE
CERTIFICATE OF CORRECTION

PATENT NO. : 5,880,454
DATED : March 9, 1999
INVENTOR(S) : Andre MONICAULT

It is certified that error appears in the above-identified patent and that said Letters Patent is hereby corrected as shown below:

Title page,
Under Item [56] REFERENCES CITED, insert --FOREIGN PATENT DOCUMENTS

DE-C-38 04 361  8/1998  Germany

FR-A-2 538 930  7/1994  France

DE-U-93 10 093  9/1993  Germany

EP-A-0 617 382  9/1994  EPO--.

Signed and Sealed this

Tenth Day of October, 2000

Attest:

Q. TODD DICKINSON

*Attesting Officer*    *Director of Patents and Trademarks*